(12) United States Patent
Kislevitz et al.

(10) Patent No.: US 10,645,468 B1
(45) Date of Patent: May 5, 2020

(54) SYSTEMS AND METHODS FOR PROVIDING VIDEO SEGMENTS

(71) Applicant: GoPro, Inc., San Mateo, CA (US)

(72) Inventors: Abraham Kislevitz, San Mateo, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/208,256

(22) Filed: Dec. 3, 2018

(51) Int. Cl.
| | |
|---|---|
| *H04N 21/84* | (2011.01) |
| *H04N 21/845* | (2011.01) |
| *H04N 21/8549* | (2011.01) |
| *G06K 9/00* | (2006.01) |

(52) U.S. Cl.
CPC ..... *H04N 21/8456* (2013.01); *G06K 9/00718* (2013.01); *H04N 21/8549* (2013.01); *G06K 2009/00738* (2013.01)

(58) Field of Classification Search
CPC ..... G06K 9/00718; G06K 2009/00738; H04N 21/8456; H04N 21/8549
See application file for complete search history.

(56) References Cited

U.S. PATENT DOCUMENTS

2003/0052910 A1\* 3/2003 Shiiyama ............. G11B 27/034
715/719
2008/0208872 A1\* 8/2008 Gavalda ................. G11B 27/10

\* cited by examiner

*Primary Examiner* — Eileen M Adams
(74) *Attorney, Agent, or Firm* — Esplin & Associates, PC (57) ABSTRACT

A video set of one or more videos may include video content having a progress length. The video content may be segmented into a sequence of video content segments. The sequence of video content segments may be provided for presentation on a display as individual video clips. Individual video content segments may be provided as individual video clips.

20 Claims, 6 Drawing Sheets

FIG. 4B video content segment sequence A-1 500 video content segment sequence A-2 500 continuity of feature(s)

FIG. 5

SYSTEMS AND METHODS FOR PROVIDING VIDEO SEGMENTS

FIELD

This disclosure relates to segmenting video content into a sequence of video content segments and providing the sequence of video content segments as individual video clips.

BACKGROUND

A video edit may tell a story by including different portions of one or more videos in a sequence. Providing the entire length of the video edit at once may be time consuming and resource intensive (e.g., high bandwidth consumption, high memory usage).

SUMMARY

This disclosure relates to providing video segments. Video information and/or other information may be obtained. The video information may define a video set. The video set may include video content having a progress length. The video content may be segmented into a sequence of video content segments. Individual video content segments may correspond to a portion of the progress length. The video content segments may include a first video content segment corresponding to a first portion of the progress length and a second video content segment corresponding to a second portion of the progress length subsequent to the first portion of the progress length. The sequence of video content segment may include the second video content segment subsequent to the first video content segment. The sequence of video content segments may be provided for presentation on a display as individual video clips such that the first video content segment is provided as a first video clip and the second video content segment is provided as a second video clip subsequent to the provision of the first video clip.

A system that provides video segments may include one or more electronic storage, processor and/or other components. The electronic storage may store video information defining a video set, information relating to a video set, information relating to segmentation of video content, information relating to a sequence of video content segments, information relating to provision of video content segments, information relating to video clips, and/or other information.

The processor(s) may be configured by machine-readable instructions. Executing the machine-readable instructions may cause the processor(s) to facilitate providing video segments. The machine-readable instructions may include one or more computer program components. The computer program components may include one or more of a video information component, a segment component, a provision component, and/or other computer program components.

The video information component may be configured to obtain video information defining a video set. The video set may include video content having a progress length. In some implementations, the video set may include a single video captured by an image capture device for a duration corresponding to the progress length. In some implementations, the video set may include a video edit of a single video or multiple videos.

The segment component may be configured to segment the video content into a sequence of video content segments. Individual video content segments may correspond to a portion of the progress length. The video content segments may include a first video content segment corresponding to a first portion of the progress length and a second video content segment corresponding to a second portion of the progress length subsequent to the first portion of the progress length. The sequence of video content segment may include the second video content segment subsequent to the first video content segment.

In some implementations, the video content may be segmented into the sequence of video content segments based on identification of moments of interest within the video content. The individual video content segments may include one or more of the moments of interest.

In some implementations, the video content may be segmented into the sequence of video content segments based on continuity of one or more features of the video content across adjacent video content segments. The video content may be segmented based on the continuity of feature(s) of the video content such that the sequence of video content segments includes (1) the first video content segment adjacent to the second video content segment, and (2) a first feature of the video content extends from an ending portion of the first video content segment to a starting portion of the second video content segment. The feature(s) of the video content may include one or more of a visual feature, an audio feature, a motion feature, a transition feature, and/or other features.

In some implementations, the video content segments may be arranged into the sequence based on a video sequence template and/or other information. The video sequence template may include a pre-defined ordering of video portions for including in the sequence.

The provision component may be configured to provide the sequence of video content segments for presentation on a display. The sequence of video content segments may be provided as individual video clips such that the first video content segment is provided as a first video clip and the second video content segment is provided as a second video clip subsequent to the provision of the first video clip.

In some implementations, the provision of the sequence of video content segments for presentation on the display may include uploading of the sequence of video content segments to a user-specified platform as separate video clip files. The separate video clip files may be uploaded to the user-specified platform in an order in which the video content segments are arranged within the sequence.

In some implementations, the provision of the first video clip may transition into the provision of the second video clip based on user input to skip from the first video content segment to the second video content segment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
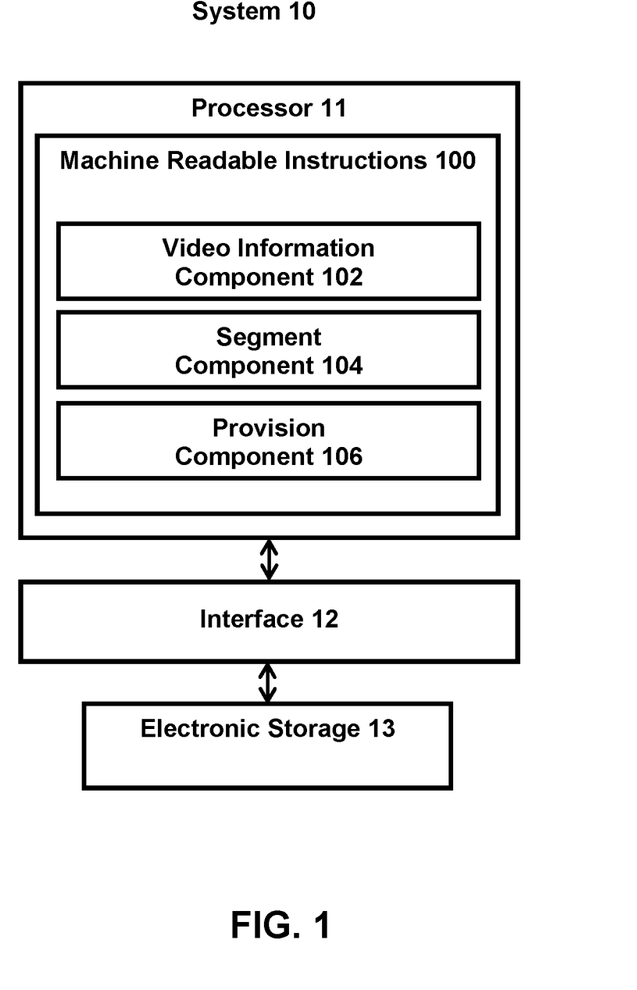
FIG. 1 illustrates a system that provides video segments.

FIG. 1 illustrates a system 10 for providing video segments. The system 10 may include one or more of a processor 11, an interface 12 (e.g., bus, wireless interface), an electronic storage 13, and/or other components. Video information and/or other information may be obtained by the processor 11. The video information may define a video set. The video set may include video content having a progress length. The video content may be segmented into a sequence of video content segments. Individual video content segments may correspond to a portion of the progress length. The video content segments may include a first video content segment corresponding to a first portion of the progress length and a second video content segment corresponding to a second portion of the progress length subsequent to the first portion of the progress length. The sequence of video content segment may include the second video content segment subsequent to the first video content segment. The sequence of video content segments may be provided for presentation on a display as individual video clips such that the first video content segment is provided as a first video clip and the second video content segment is provided as a second video clip subsequent to the provision of the first video clip.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video set, information relating to a video set, information relating to segmentation of video content, information relating to a sequence of video content segments, information relating to provision of video content segments, information relating to video clips, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Video information may be stored within a single file or multiple files. For example, video information defining a video may be stored within a video file, multiple video files, a combination of different files (e.g., a visual file and an audio file), and/or other files. Video information may be stored in one or more formats/container. A format may refer to one or more ways in which the information defining a video is arranged/laid out (e.g., file format). A container may refer to one or more ways in which information defining a video is arranged/laid out in association with other information (e.g., wrapper format).

Content of one or more videos may be referred to as video content. Video content may have a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may be included within one or more video frames of the video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. Visual content may be generated based on light received within a field of view of a single image sensor or within fields of view of multiple image sensors during a capture period.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing video segments. The machine-readable instructions 100 may include one or more computer program components. The machine-readable instructions 100 may include one or more of a video information component 102, a segment component 104, a provision component 106, and/or other computer program components.

The video information component 102 may be configured to obtain video information defining one or more video sets and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain the video information from a storage location, such as the electronic storage 13, electronic storage of information and/or signals generated by one or more capture devices (e.g., image sensors), electronic storage of a capture device, electronic storage of a device accessible via a network, and/or other locations. The video information component 102 may obtain the video information from one or more hardware components (e.g., an image sensor) and/or one or more software components (e.g., software running on a computing device In some implementations, the video information may be obtained based on user interaction with a user interface/application (e.g., video editing application), and/or other information. For example, a user interface/application may provide option(s) for a user to select one or more videos (e.g., for sharing). Video information defining one or more videos may be obtained based on the user's selection of the video(s) through the user interface/video application.

A video set may refer to a set of one or more video. A video set may include video content of one or more videos. The video content may have a progress length. In some implementations, the video set may include a single video captured by an image capture device for a duration corresponding to the progress length. That is, the content of the video set may include video content of a single video. In some implementations, the video set may include a multiple videos captured by one or more image capture devices. That is, the content of the video set may include video content of multiple videos. In some implementations, the video set may include a video edit of a single video or multiple videos. A video edit may refer to a particular arrangement and/or manipulation of one or more portions of video content (from a single video or multiple videos). A video edit may include multiple portions of video content arranged in a sequence. A video edit may include one or more portion of the video content that have been visually and/or audibly manipulated (e.g., visually and/or audibly changed). The content of the video set may include edited video content of a single video or multiple videos.

Figure 3A:
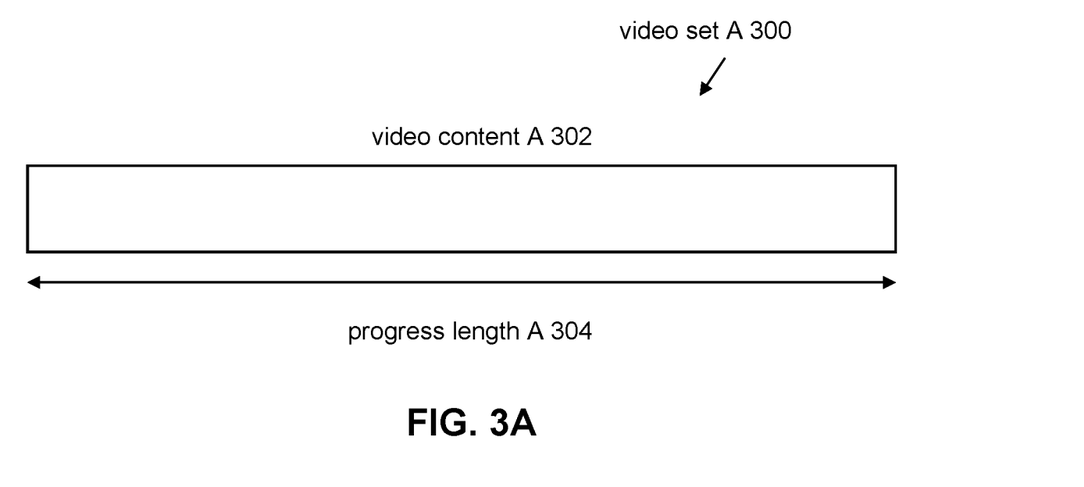
FIGS. 3A-3B illustrate example video sets.

FIGS. 3A-3B illustrate example video sets 300, 350. Referring to FIG. 3A, the video set A 300 may include a single video (video A). The content of the video set A 300 may include video content A 302 of the single video. The video content A 302 may have a progress length A 304, and the video content of the video set A 300 may have the progress length A 304. That is, because the video set A 300 includes a single video, the progress length of the video set A 300 may be the same as the progress length of the single video.

Figure 3B:
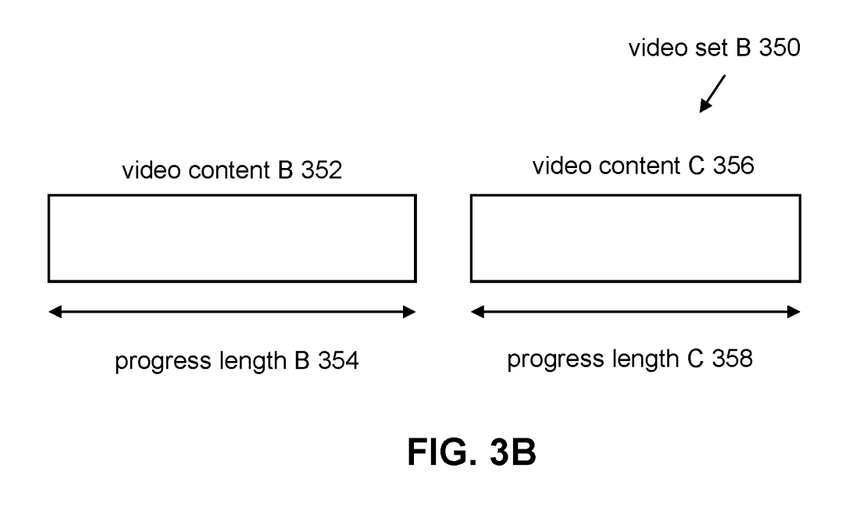

Referring to FIG. 3B, the video set B 350 may include two videos (video B, video C). The content of the video set B 350 may include video content B 352 and the video content C 356 of the two videos. The video content B 352 may have a progress length B 354, the video content C 356 may have a progress length C 358, and the video content of the video set B 350 may have a progress length that includes the progress length B 354 and the progress length C 358. That is, because the video set B 350 includes multiple videos, the progress length of the video set B 350 may be the same as the combination of the progress lengths of the multiple videos.

The content of the video set A 300 and/or the video set B 350 may include edited video content. For example, referring to FIG. 3B, the video content B 352 may include a portion of a video and the video content C 356 may include a portion of another video. The video content B 352 and the video content C 356 may be arranged in a sequence such that a playback of the video set B 350 includes playback of the video content B 352 before the playback of the video content C 356.

In some implementations, obtaining video information defining a video set may include identifying one or more videos for provision. The video information component 102 may identify one or more videos to be provided and/or one or more videos including portion(s) to be provided. For example, the video information component 102 may identify particular videos among one or more collections of videos for provision. The video information component 102 may identify videos based on one or more shared/common characteristics of the videos, such as content captured within the video (e.g., object, activity, scenery), time of video capture, location of video capture, and/or other shared/common characteristics of the video. For example, a user may select a particular trip covering a duration of time and certain locations as a criteria for identifying videos and the video information component 102 may obtain video information defining those videos that meet the criteria.

The video information component 102 may identify videos based on tagging, marking, uploading, and/or other indication that the videos have been selected for provision. For example, a user may have tagged, marked, uploaded, and/or otherwise indicated that one or more videos should be provided and/or shared. The tagging, marking, uploading, and/or other indication may be performed by the user for multiple videos at once or at different times. For example, a user capturing videos during a trip may tag, mark, upload, and/or otherwise indicate particular videos captured during the trip for provision at the end of the trip or during the trip (e.g., as the videos are captured). The video information component 102 may obtain video information defining those videos that have been tagged, marked, uploaded, and/or otherwise indicated for provision (e.g., sharing with others).

Referring back to FIG. 1, the segment component 104 may be configured to segment the video content of the video set into a sequence of video content segments. Segmenting the video content may include dividing the video content into separate parts or sections. Individual part or section of the video content may be referred to as a video content segment. Individual video content segment may correspond to a portion of the progress length of the video content. The video content segments may be arranged into a sequence. A sequence of video content segments may refer to a particular order in which the video content segments are arranged for playback. Video content segments may be arranged within a sequence of video content segments based on time of capture associated with the individual video content segments, based on content of the video content segments, and/or other information. For example, video content segments may be arranged within a sequence of video content segments based on time of capture such that the sequence of video content segments provide a chronological viewing of parts/sections of the video content. Video content segments may be arranged within a sequence of video content segments based on content of the video content segments (what has been captured within the video content segments) such that the sequence of video content segments provide a particular story based on presentation of different content captured within the video content segments (e.g., presentation of an intro-content, followed by action-content, followed by ending-content).

The segment component 104 may segment the entirety of the video content or one or more portions of the video content into a sequence of video content segments. That is, the segment component 104 may divide the entirety of the video content into different video content segments for inclusion in a sequence, or the segment component 104 may divide one or more portions of the video content info different video content segments for inclusion in a sequence.

Figure 4A:
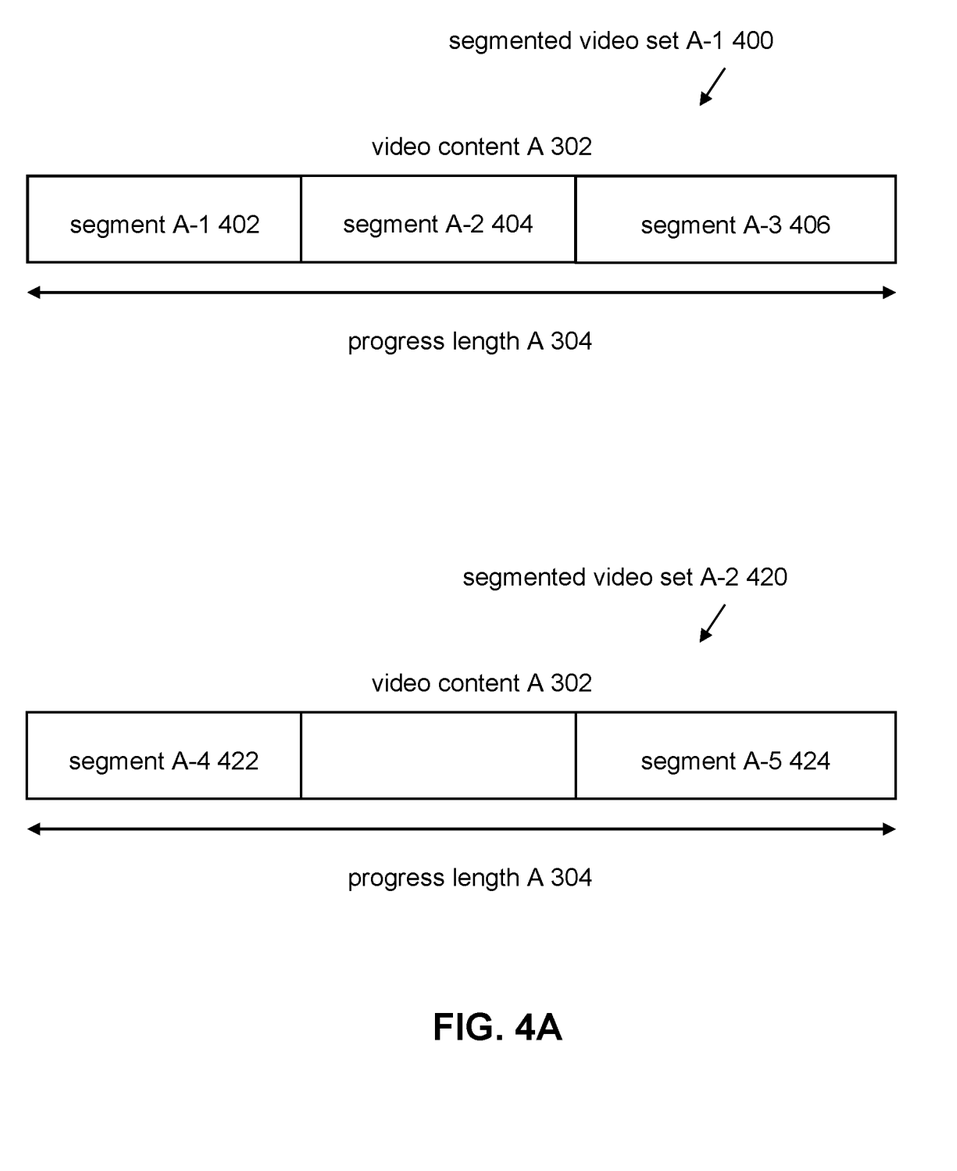
FIGS. 4A-4B illustrate example segmentations of video sets.

FIGS. 4A-4B illustrate example segmentations of video sets. Referring to FIG. 4A, a segmented video set A-1 400 may include the entirety of the video content A 302 (entire progress length A 304 of the video content A 302) segmented into a segment A-1 402, a segment A-2 404, and a segment A-3 406. The segmented video set A-1 400 may include the segment A-1 402 corresponding to the beginning portion of the progress length A 304, the segment A-2 404 corresponding to the middle portion (subsequent to the beginning portion) of the progress length A 304, and the segment A-3 406 corresponding to the ending portion (subsequent to the middle portion) of the progress length A 304. The sequence of video content segments may be arranged as shown in FIG. 4A, with the playback of the sequence including the playback of the segment A-1 402, followed by the segment A-2 404, followed by the segment A-3 406. Such a sequence of video content segments is shown as a video content segment sequence A-1 500 in FIG. 5.

A segmented video set A-2 420 may include the beginning and ending portions of the video content A 302 (beginning and ending portions of progress length A 304 of the video content A 302) segmented into a segment A-4 422 and a segment A-5 424. The segmented video set A-2 420 may include the segment A-4 422 corresponding to the beginning portion of the progress length A 304 and the segment A-5 424 corresponding to the ending portion of the progress length A 304. The sequence of video content segments may be arranged as shown in FIG. 4A, with the playback of the sequence including the playback of the segment A-4 422, followed by the segment A-5 424.

Figure 4B:
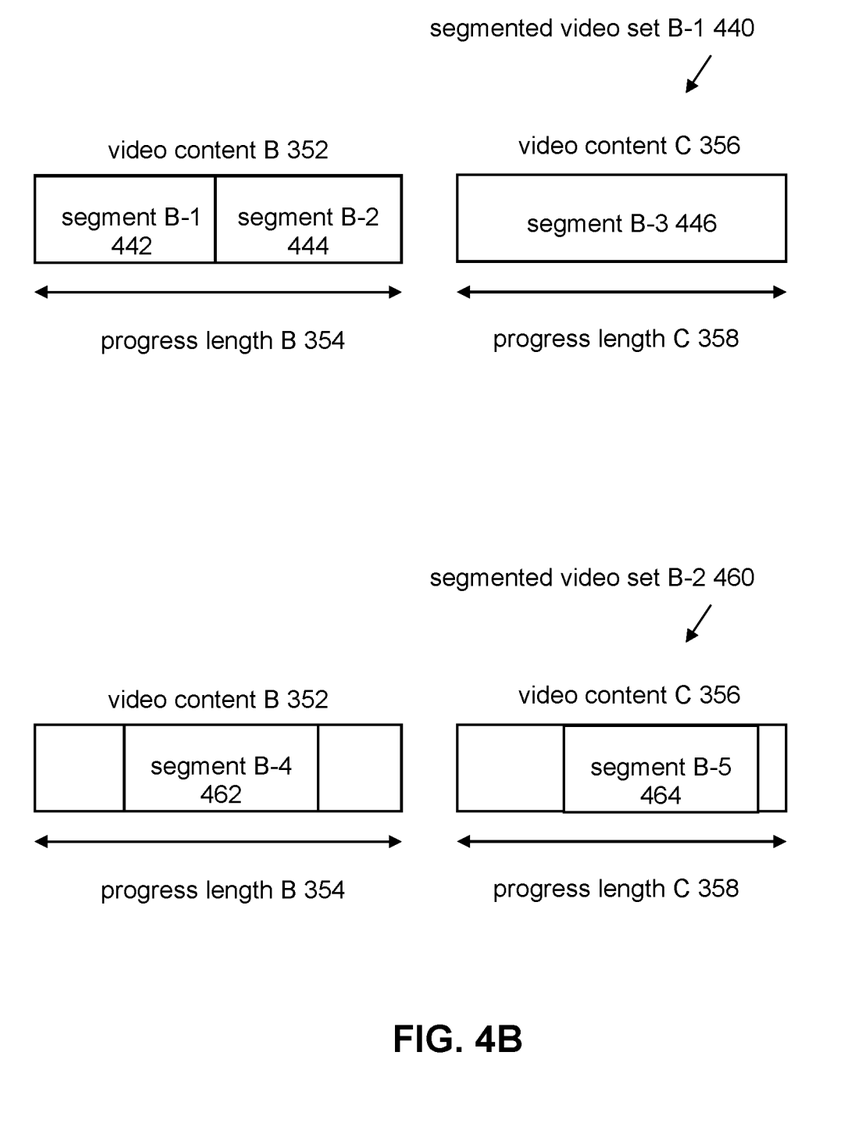

Referring to FIG. 4B, a segmented video set B-1 440 may include the entirety of the video content B 352 (entire progress length B 354 of the video content B 352) and the entirety of the video content C 356 (entire progress length C 358 of the video content C 356) segmented into a segment B-1 442, a segment B-2 444, and a segment B-3 446. The segmented video set B-1 440 may include the segment B-1 442 corresponding to the beginning portion of the progress length B 354, the segment B-2 444 corresponding to the ending portion (subsequent to the beginning portion) of the progress length B 354, and the segment B-3 446 corresponding to the entirety of the progress length C 358. The sequence of video content segments may be arranged as shown in FIG. 4B, with the playback of the sequence including the playback of the segment B-1 442, followed by the segment B-2 444, followed by the segment B-3 446.

A segmented video set B-2 460 may include the middle portion of the video content B 352 and the middle portion of the video content C 356 segmented into a segment B-4 462 and a segment B-5 464. The segmented video set B-2 460 may include the segment B-4 462 corresponding to the middle portion of the progress length B 354 and the segment B-5 464 corresponding to the middle portion of the progress length C 358. The sequence of video content segments may be arranged as shown in FIG. 4B, with the playback of the sequence including the playback of the segment B-4 462, followed by the segment B-5 464.

In some implementations, the video content segments may be arranged into the sequence based on a video sequence template and/or other information. A video sequence template may include a pre-defined ordering of video portions for including in the sequence. The pre-defined ordering of video portions may determine in what order the video content segments are arranged within the sequence. For example, a video sequence template for a surfing video may include a pre-defined ordering of video portions in the following order: (1) video portion(s) including beach scene(s), (2) video portion(s) including paddling scene(s), and (3) video portion(s) including wave-riding scene(s) (arranged chronologically or arranged based on captured content, such as from the video portion including the smallest wave to the video portion including the biggest wave). The video content segments may be arranged into the sequence to following the video sequence template. For example, referring to FIG. 5, the video content segment sequence A-2 500 may include the segment A-2 404, followed by the segment A-1 402, followed by the segment A-3 406 based on a video sequence template and/or other information.

In some implementations, the segment component 104 may segment the video content based on a video edit and/or other information. The video edit may include portions of video content from one or more videos, and the segment component 104 may segment the video content of the video edit based on how the video edit was created. For example, referring to FIG. 3B, the video set B 350 may include a video edit with the video content B 352 and the video content C 356 arranged in a sequence. The segment component 104 may segment the video content of the video set B 350 into one or more segments including the video content B 352 and one or more segments including the video content C 356. That is, the video edit may be made up of two video clips, and rather than providing the video edit as a single file, the video edit may be segmented into individual video clips or portions of the individual video clips for provision. Such provision of the video edit may enable creation of the video edit as separate clips (rather than creating the video edit as a single video file) and providing of those separate clips to provide the video edit.

In some implementations, the segment component 104 may segment the video content into a sequence of video content segments to create one or more video edits. For example, the video content may be segmented into segments of one or more progress lengths and arranged within a sequence to create a video edit. The progress lengths of the individual segments may be fixed or may range between a minimum length and a maximum length. For instance, the segments component 104 may be constrained from segmenting the video content into too short or too long of a segment, and/or may be biased to segment the video content into segments of a target length.

Video content may be segmented into a sequence of video content segments based on identification of moments of interest within the video content. A moment of interest may refer to a moment (e.g., point in time, duration of time) within the progress length of the video content in which something of interest (e.g., to one or more users) is captured. For example, a moment of interest may refer to a moment within the progress length of the video content in which an activity or an event of interest is occurs. A moment of interest within the video content may be identified based on (1) metadata (e.g., motion data, location data, sound data) captured concurrently with the video content, (2) analysis of the video content (e.g., video frame analysis, audio clip analysis), (3) user identification during or after video content capture, and/or other information. The segment component 104 may segment the video content such that individual video content segments include one or more of the moments of interest.

For example, individual video content segments may provide a view of an interesting scene within the video content. Individual video content segments may include a portion of the progress length that (1) encompasses the moment of interest and (2) extends before and/or after the moment. The amount of progress length included in a video content segment (e.g., length of video content) and/or the placement of the moment within the video content segment may be determined based on the moment of interest, such as the type of activity (e.g., skiing activity, surfing activity, hiking activity) occurring during the moment of interest and/or the type of events occurring during the activity (e.g., fast motion event, slow motion event, acceleration event, falling event, standing event, jumping event).

For instance, a video content segment may include a moment of interest, and the length of the video content segment may be determined based on an activity occurring during the moment, an event occurring during the moment, and/or other information. The video content segment may include a length of the video content that precedes the moment of interest and/or a length of the video content that follows the moment of interest, with the different lengths determined based on an activity occurring during the moment, an event occurring during the moment, and/or other information. The lengths of the video content preceding and following the moment may determine the placement of the moment of interest within the video content. For example, a video content segment may include the moment of interest in the starting half, in the middle, or in the ending half of the video content segment based on an activity occurring during the moment, an event occurring during the moment, and/or other information.

In some implementations, a video content segment may include multiple moments of interest. For example, two moments of interest may be in close proximity to each other, and creating two separate video content segments may result in the video content segments being too short or being separate by small progress length. Inclusion of such short video segments may not create an enjoyable video edit. Inclusion of video segments separated by small progress length may result in the playback of the video edit appearing to include a video freeze (for the small progress length between the two video content segments) rather than there being a presentation of edited video portions.

In some implementations, a video edit created from the video content segments may include a video summary portion. A video summary may refer to a collection of video portions that provides a preview of what is contained within different videos. Snippets of different scenes included within different video content segments may be identified for presentation in the video edit as a video summary portion, followed by the presentation of the video content segments.

In some implementations, the video content may be segmented into the sequence of video content segments based on continuity of one or more features of the video content across adjacent video content segments. A feature may refer to a visual and/or audible attribute/aspect of content captured within the video content. A feature of the video content may be static or dynamic. For example, the feature(s) of the video content may include one or more of a visual feature, an audio feature, a motion feature, a transition feature, and/or other features. A visual feature may refer to one or more visible things (e.g., person, face, stance, posture, emotion displayed via face and/or body, color, scene composition, brightness) captured within the video content. An audio feature may refer to one or more audible things (e.g., shout, scream, voice, sound) captured within the video content. A motion feature may refer to one or more motions captured within the video content, such as the motion present within the images/video frames based on motion (e.g., speed, velocity, acceleration) of the image capture device and/or change in the field of view (e.g., zoom change, panning) of the image capture device and/or motion of an object/activity captured within the video content. A transition feature may refer to one or more transitions (e.g., crossfade, fade-to-black, fade-from-black, dissolve, swipe, and fly-in) used within the video content.

A continuity of features across multiple video content segments may include a particular feature of the video content being present at both the end of a video content segment and the beginning of a following video content segment. Such segmentation of video content into a sequence may provide linkage between different scenes within the video content segments. The ending of one video content segment in the sequence may be visually and/or audibly related to the beginning of the next video content segment in the sequence.

For example, the video content may be analyzed to identify matching feature(s) within different parts of the video content. Match of a feature within different parts of the video content may include the same feature or similar features (e.g., features that fall within a threshold similarity) being present within different parts of the video content. The segmentation of video content into a sequence based on the matched features may include concatenation of different video content segments within the sequence such that one or more features are preserved from the ending of one video content segment to the subsequent video content segment.

Figure 5:
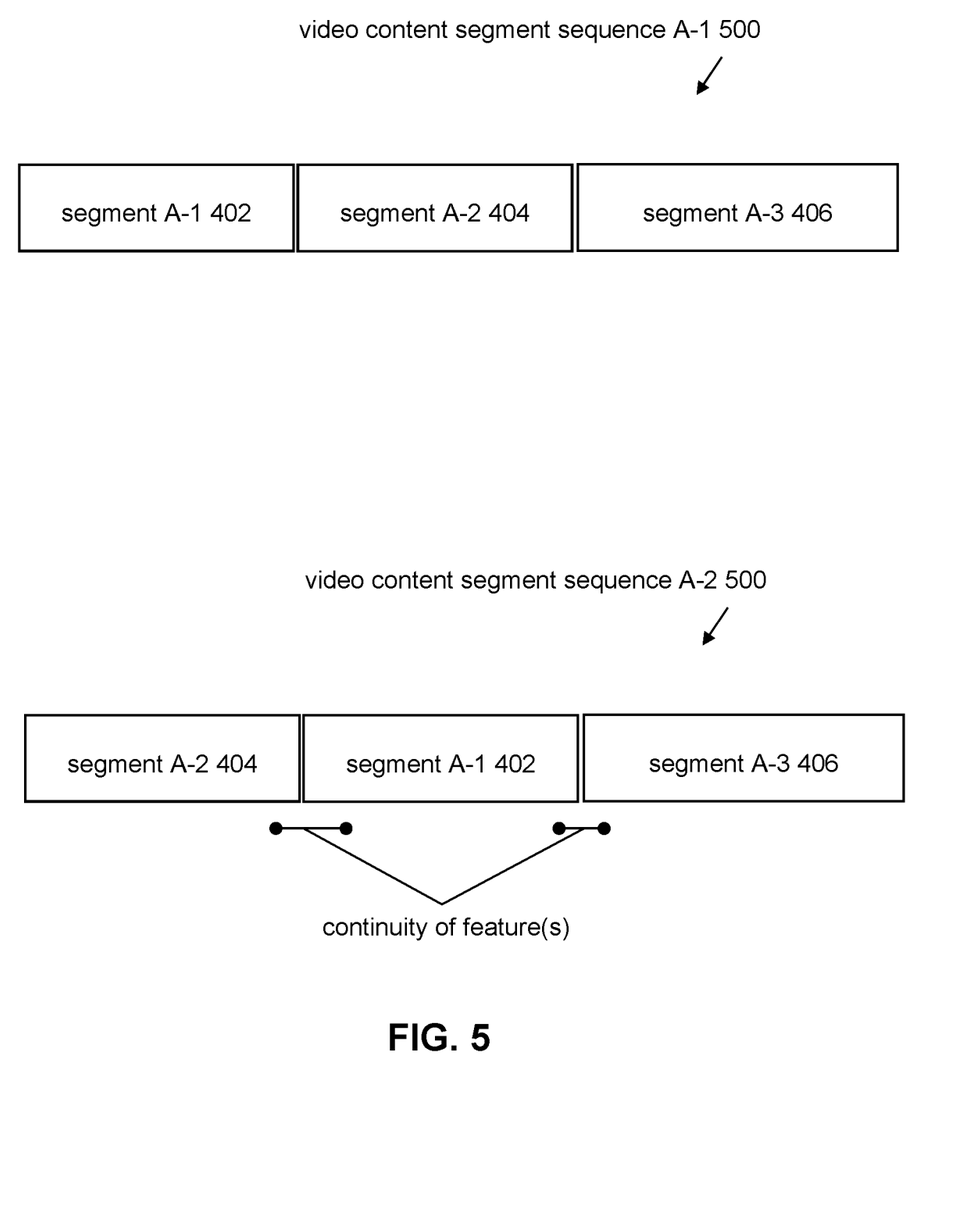
FIG. 5 illustrates example sequences of video content segments.

For example, referring to FIG. 5, the video content may be segmented into the video content segment sequence A-2 500 based on the continuity of feature(s) of the video content such that the video content segment sequence A-2 500 includes the segment A-2 404 adjacent to and preceding the segment A-1 402, and the segment A-1 402 adjacent to and preceding the segment A-3 406. One or more features of the video content may extend from an ending portion of the segment A-2 404 to a starting portion of the segment A-1 402, and one or more features of the video content may extend from an ending portion of the segment A-1 402 to a starting portion of the segment A-3 406. Other segmentation of video sets/video content are contemplated.

Referring back to FIG. 1, the provision component 106 may be configured to provide the sequence of video content segments for presentation on one or more displays. The provision component 106 may provide the sequence of video content segments directly to a computing device including/coupled to the display(s) and/or indirectly to the computing device via one or more intermediate computing devices, such as one or more servers. The provision of the sequence of video content segments may include making the sequence of video content segments available for presentation on the display(s), making the sequence of video content segments available for download to the computing device including/coupled to the display(s), and/or pushing (e.g., sending, transmitting) the sequence of video content segments to the computing device including/coupled to the display(s).

The sequence of video content segments may be provided as individual video clips such that individual video content segments are provided as individual video clips, with the video clips provided based on the order of the video content segments within the sequence of video content segments. For example, referring to FIG. 5, the video content segment sequence A-1 500 may be provided as three separate video clips, with the segment A-1 402 provided as the first video clip, the segment A-2 404 provided as the second video clip subsequent to the provision of the first video clip, and the segment A-3 406 provided as the third video clip subsequent to the provision of the second video clip.

The provision of video content as individual video clips in a sequence may enable a user to share a video (e.g., a video edit) or one or more portions of the video without sharing the entire file for the video (or without sharing the entire file for the video at once). The provision of video content as individual video clips in a sequence may enable a user to share a video (e.g., a video edit) as separate video clips/separate video clip files rather than as a single video/single video file. Such provision of video content may enable user(s) viewing the video (e.g., the video edit) to skip between the different video clips. Such skipping between video clips may enable user(s) viewing the video to not download portions of the video they are not interested in watching.

In some implementations, the provision of the sequence of video content segments for presentation on the display(s) may include uploading of the sequence of video content segments to one or more user-specified platforms as separate video clip files. A user-specified platform may refer to a common service and/or environment that enables sharing of media content between users, such as a video sharing service/environment. The separate video clip files may be uploaded to the user-specified platform in an order in which the video content segments are arranged within the sequence. In some implementations, the sequence of video content may be uploaded to the user-specified platform based on user action (e.g., user input indicating that upload of the sequence of video content segments should start). In some implementations, upload of individual video content segments may require user action (e.g., user prompted to confirm/start upload of individual video content segments).

For example, referring to the video content segment sequence A-1 500 shown in FIG. 5, a video clip of the segment A-1 402 may be uploaded to the user-specified platform(s) first, followed by a video clip of the segment A-2 404, followed by a video clip of the segment A-3 406. In some implementations, a user may change the sequence of video content segments during the upload. For example, while the video clip of the segment A-2 404 is being uploaded, the user may remove from the segment A-2 404 from the sequence. The removal of the segment A-2 404 from the sequence may result in the upload of the video clip of the segment A-2 404 being stopped and the upload of the video clip of the segment A-3 406 being started.

In some implementations, the provision of a video clip may transition into a provision of another video clip based on user input to skip from the video content segment of the video clip to the video content segment of the other video clip. For example, a user of a computing device including/coupled to the display(s) may be watching the video content segment sequence A-2 500. While watching the segment A-2 404, the user may provide input (e.g., via interacting with the computing device) to skip from watching the segment A-2 404 to the segment A-1 402 (e.g., user inputs command to skip to the next video clip). Based on the user input, the upload of the video clip of the segment A-2 404 to the user's computing device may be stopped and the upload of the video clip of the segment A-1 402 to the user's computing device may be started. In some implementations, the upload of the video clip of the segment A-2 404 may continue after the user has finished watching the video content segment sequence A-2 500. Such upload of the video clip of the segment A-2 404 may enable the user to watch the segment A-2 404 at a later time without having connection to a device (e.g., the system 10, a user-specified platform) from which the video content segments may be received.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

While the description herein may be directed to video content, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
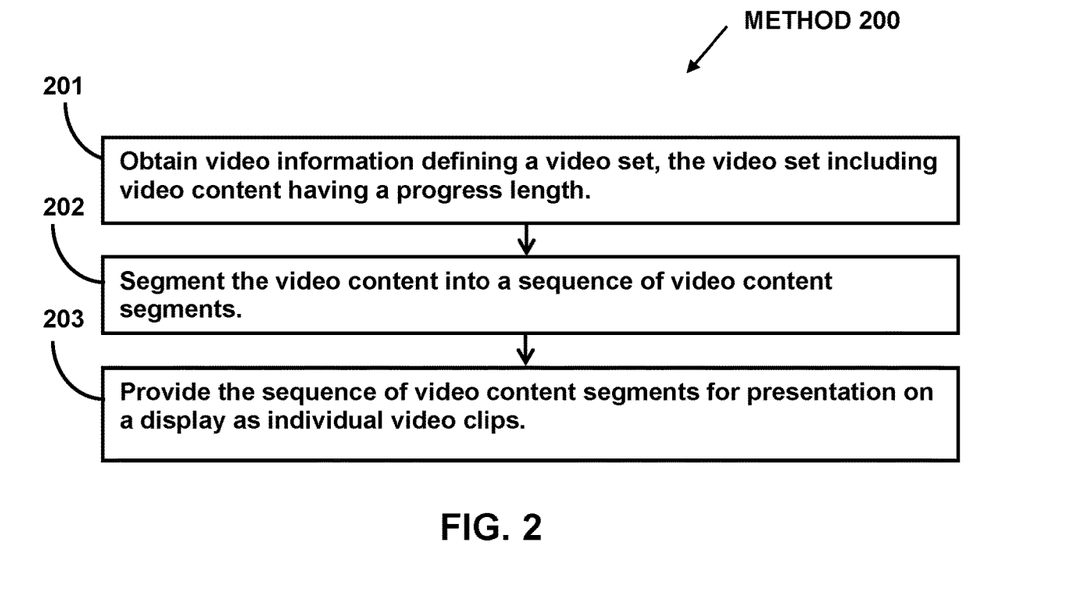
FIG. 2 illustrates a method for providing video segments.

FIG. 2 illustrates method 200 for providing video segments. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information may be obtained. The video information may defining a video set. The video set may include video content having a progress length. In some implementation, operation 201 may be performed by a processor component the same as or similar to the video information component 102 (Shown in FIG. 1 and described herein).

At operation 202, the video content may be segmented into a sequence of video content segments. Individual video content segments may correspond to a portion of the progress length of the video content. The video content segments may include a first video content segment corresponding to a first portion of the progress length and a second video content segment corresponding to a second portion of the progress length. The second portion of the progress length may be subsequent to the first portion of the progress length. The sequence of video content segment may include the second video content segment subsequent to the first video content segment. In some implementations, operation 202 may be performed by a processor component the same as or similar to the segment component 104 (Shown in FIG. 1 and described herein).

At operation 203, the sequence of video content segments may be provided for presentation on a display as individual video clips. The sequence of video content segments may be provided such that the first video content segment is provided as a first video clip and the second video content segment is provided as a second video clip subsequent to the provision of the first video clip. In some implementations, operation 203 may be performed by a processor component the same as or similar to the provision component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that provides video segments, the system comprising:
   one or more physical processors configured by machine-readable instructions to:
      obtain video information defining a video, the video including video content having a progress length, the video information stored within a single video file;
      segment the video content into a sequence of video content segments based on automated analysis of the video information, individual video content segments corresponding to a portion of the progress length, the video content segments including a first video content segment corresponding to a first portion of the progress length and a second video content segment corresponding to a second portion of the progress length, the sequence of video content segment including the second video content segment subsequent to the first video content segment; and
      provide the video content for presentation on a display as a sequence of separate video clips such that the first video content segment is provided as a first video clip and the second video content segment is provided as a second video clip subsequent to the provision of the first video clip, the provision of the video content as the sequence of separate video clips enabling the presentation of the video content to skip from presentation of the first video content segment to the second video segment by skipping from download of the first video clip to download of the second video clip.

2. The system of claim 1, wherein the video content is segmented into the sequence of video content segments based on identification of moments of interest within the video content.

3. The system of claim 2, wherein the individual video content segments include one or more of the moments of interest.

4. The system of claim 1, wherein the second portion of the progress length corresponding to the second video content segment precedes the first portion of the progress length corresponding to the first video content segment, and the sequence of video content segments is determined based on continuity of one or more features of the video content across adjacent video content segments such that the sequence of video content segments is determined to include the second video content segment adjacent and subsequent to the first video content segment to include continuity of a first feature of the video content between an ending portion of the first video content segment and a starting portion of the second video content segment.

5. The system of claim 4, wherein the one or more features of the video content include a visual feature, an audio feature, a motion feature, and/or a transition feature.

6. The system of claim 1, wherein the video includes a single video captured by an image capture device for a duration corresponding to the progress length.

7. The system of claim 1, wherein the video includes a video edit of a single video or multiple videos.

8. The system of claim 1, wherein the video content segments are arranged into the sequence based on a video sequence template, the video sequence template including a pre-defined ordering of video portions for including in the sequence.

9. The system of claim 1, wherein the provision of the first video clip transitions into the provision of the second video clip based on user input to skip from the first video content segment to the second video content segment.

10. The system of claim 1, wherein the provision of the video content for presentation on the display includes uploading of the sequence of video content segments to a user-specified platform as the separate video clip files, wherein the separate video clip files are uploaded to the user-specified platform in an order in which the video content segments are arranged within the sequence.

11. A method for providing video segments, the method performing by a computing system including one or more processors, the method comprising:
   obtaining, by the computing system, video information defining a video, the video including video content having a progress length, the video information stored within a single video file;
   segmenting, by the computing system, the video content into a sequence of video content segments based on automated analysis of the video information, individual video content segments corresponding to a portion of the progress length, the video content segments including a first video content segment corresponding to a first portion of the progress length and a second video content segment corresponding to a second portion of the progress, the sequence of video content segment including the second video content segment subsequent to the first video content segment; and
   providing, by the computing system, the video content for presentation on a display as a sequence of separate video clips such that the first video content segment is provided as a first video clip and the second video content segment is provided as a second video clip subsequent to the provision of the first video clip, the provision of the video content as the sequence of separate video clips enabling the presentation of the video content to skip from presentation of the first video content segment to the second video segment by skipping from download of the first video clip to download of the second video clip.

12. The method of claim 11, wherein the video content is segmented into the sequence of video content segments based on identification of moments of interest within the video content.

13. The method of claim 12, wherein the individual video content segments include one or more of the moments of interest.

14. The method of claim 11, wherein the second portion of the progress length corresponding to the second video content segment precedes the first portion of the progress length corresponding to the first video content segment, and the sequence of video content segments is determined based on continuity of one or more features of the video content across adjacent video content segments such that the sequence of video content segments is determined to include the second video content segment adjacent and subsequent to the first video content segment to include continuity of a first feature of the video content between an ending portion of the first video content segment and a starting portion of the second video content segment.

15. The method of claim 14, wherein the one or more features of the video content include a visual feature, an audio feature, a motion feature, and/or a transition feature.

16. The method of claim 11, wherein the video includes a single video captured by an image capture device for a duration corresponding to the progress length.

17. The method of claim 11, wherein the video includes a video edit of a single video or multiple videos.

18. The method of claim 11, wherein the video content segments are arranged into the sequence based on a video sequence template, the video sequence template including a pre-defined ordering of video portions for including in the sequence.

19. The method of claim 11, wherein the provision of the first video clip transitions into the provision of the second video clip based on user input to skip from the first video content segment to the second video content segment.

20. The method of claim 11, wherein the provision of the video content for presentation on the display includes uploading of the sequence of video content segments to a user-specified platform as the separate video clip files, wherein the separate video clip files are uploaded to the user-specified platform in an order in which the video content segments are arranged within the sequence.

* * * * *